INVENTOR
FRANZ CLASSEN
BY Irving M. Weiner
ATTORNEY

June 27, 1972  F. CLASSEN  3,672,859
METHOD FOR THE PRODUCTION OF A FLOAT GLASS STRIP
HAVING A ROUGHENED UPPER SURFACE
Filed Dec. 16, 1969  3 Sheets-Sheet 3

INVENTOR

FRANZ CLASSEN

BY *Irving M. Weiner*

ATTORNEY

United States Patent Office 3,672,859
Patented June 27, 1972

3,672,859
METHOD FOR THE PRODUCTION OF A FLOAT GLASS STRIP HAVING A ROUGHENED UPPER SURFACE

Franz Classen, Porz-Grengel, Germany, assignor to Erste Deutsche Floatglas GmbH & Co. OHG, Porz, Cologne, Germany
Filed Dec. 16, 1969, Ser. No. 885,500
Claims priority, application Germany, Jan. 25, 1969,
P 19 03 756.0
Int. Cl. C03b 13/04
U.S. Cl. 65—93                                        6 Claims

ABSTRACT OF THE DISCLOSURE

Glass floating on tin in a float glass plant is superficially roughened by a tool. This method is accomplished by producing a temperature gradient through the glass so that the upper surface has a higher temperature than the glass further down. The upper surface of the glass is roughened by a non-adhesive frictional tool and the glass is heat treated to preserve the upper surface of the glass.

BACKGROUND OF INVENTION (1) Field of the invention

The present invention relates to methods for the production of flat glass strip with a patterned surface. The invention takes as a basis the float glass method in which molten glass is poured at a controlled rate on to a bath of molten metal, such as tin, on which the glass forms a layer of even thickness which floats along the surface of the tin and is cooled along the length of the tin bath owing to a suitable regulation of its temperature.

(2) Prior art

In accordance with the float glass method, the only type of glass in practice which is generally produced is glass with plane parallel fire polished surfaces. For the production of glasses with patterned or embossed surfaces, use is either made of the so-called rolling method in which the glass strip is formed at high temperatures by a pair of rolls, which have an embossed roll surface which acts upon the glass surface, or the transparent glass sheet is superficially treated while cold by etching, sand blasting or other suitable surface treatment so as to produce the ornamental form of glass product desired.

SUMMARY OF INVENTION

It has now been found that with the help of the float glass method a completely new ornamental glass can be produced if the glass trip within the tin bath container is brought into frictional contact on at least one of its sides with a tool which is hard at the temperature obtaining in the bath and to which the glass does not adhere, subsequent heat treatment being carried out in such a manner that the roughening of the surface produced by the tool is at least partially preserved. In this respect it is particularly advantageous if the upper surface of the glass strip is roughened.

Following this procedure, a glass strip with a matt surface is produced which is generally similar to the surface of an etched glass product.

It has been found that the best results can be obtained if the surface roughening of the glass strip is carried out in a temperature range extending from approximately 850 to approximately 880° C. in the case of glass compositions which are conventional for flat glass.

In accordance with a further development of the invention, the method can also be carried out in such a manner that following the surface roughening the glass strip is stretched in its longitudinal direction so as to reduce its breadth and thickness. In this case it has been found, surprisingly, that the roughened surface is "torn open" or interrupted so that there is a more or less irregular arrangement of alternating regions or strips with roughened and fire polished glass surface. In this manner an ornamental glass with a completely new and attractive pattern is produced.

The method in accordance with the invention also has other substantial advantages. Thus, for example, during the production of normal float glass in which for some reasons the glass produced becomes faulty, in which the glass strip tends to have an optical quality which is not acceptable, the installation can at short notice be switched over to the production of ornamental glass in which the optical faults do not have any significance. Furthermore the ornamental glass produced in this manner is ideally suitable for thermal tempering.

In accordance with a further development of the invention, at a position adjacent to the surface roughening, a temperature gradient is produced through the thickness of the glass in such a manner that by the supply of heat from above or by an increased removal of heat from below the upper surface has a temperature which is higher than the core or bottom layer. In this manner a colder bottom layer is obtained which has a viscosity higher than that of the upper layer at a position adjacent to the treatment of the surface for roughening it. Owing to the stiffness of the bottom layer floating on the yielding tin bath the glass strip is better able to withstand the frictional or rubbing tool, and in this manner it is possible to avoid troublesome distortions in the glass strip. Furthermore on the drawing out the glass strip the raking up of the less viscous surface is favored.

It is also advantageous to supply heat to the upper surface following the roughening treatment in order to remove the fine surface damage to such an extent that the strength of the glass is not impaired by the damage.

It is also possible to carry out the method in such a manner that particular preferred patterns appear from the glass surface. It is, for example, possible to obtain a stripwise roughening of the glass surface by, for example, selecting the tool material or shaping its surface in such a manner that there is only a stripwise contact with the glass surface.

BRIEF DESCRIPTION OF DRAWINGS

The invention will now be explained in more detail with reference to the accompanying drawings.

DESCRIPTION OF PREFERRED EMBODIMENTS

Figure 1:
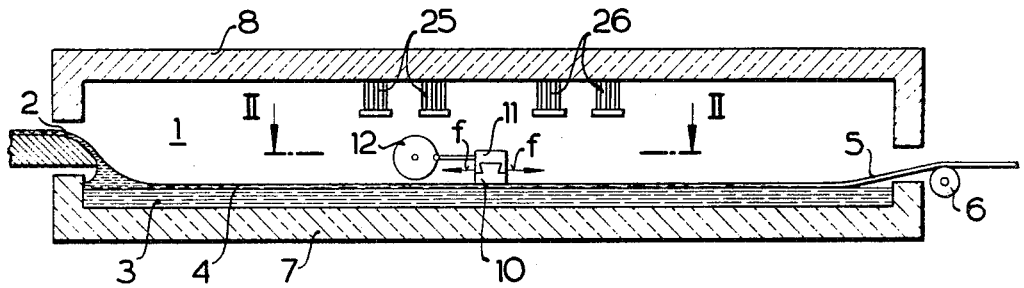
FIG. 1 is a diagrammatic view of an installation for carrying out the method in accordance with the invention.

Referring now to the drawings and more particularly to FIG. 1, it will be seen that liquid glass is poured on to the tin bath 3 of a float glass installation inside the tin bath chamber 1. The glass forms a glass layer 4, of even thickness on the tin bath, which is removed as a glass strip 5 over the liquid tin and passes between propelling rolls 6. The tin bath container or chamber is constituted principally by the bottom part 7 of refractory material and the roof part 8. Within the tin bath container 1 closed off from the outside atmosphere, a protective gas atmosphere is maintained in order to prevent oxidation of the tin.

On its passage through the tin bath chamber the temperature of the glass sinks from approximately 1000° C. on pouring on to the tin bath to about 600° C. on being removed from the chamber or container. The course of the temperature along the tin bath can be controlled within wide limits by the use of suitable heating and cooling means.

Approximately in the center of the tin bath container 1 there is a rubbing or frictional tool 10 which extends transversely over the glass trip. It is supported by means of a holding device 11 at such a height that it acts with the required pressure on the glass strip. The temperature of the glass strip at this position is between 850 and 880° C.

Upstream from the rubbing tool 10 in the direction of movement of the glass band, electric heat radiators 25 are provided under the roof 8 by means of which the temperature of the upper side of the glass strip can be set shortly before the glass is roughened so that the temperature on the top of the glass is higher than in the bottom layer of it. Owing to the contact with the rubbing tool 10 the upper side may again fall in temperature though the heat radiating means 26 can be used to heat it up again following the roughening treatment to the extent required in the individual case. The precise temperature conditions can be determined by tests in each particular case.

The rubbing or frictional tool 10 can be arranged so that it is not able to move. Owing to the movement of the glass strip there is a relative movement between the frictional tool and the glass strip which is sufficient for the roughening process. It can, however, be advantageous to cause the frictional tool 10 to perform an additional relative movement in relation to the glass strip in order to enhance the roughening effect. The movement of the tool on the glass strip surface can run in a direction of one of the arrows f, the return movement of the frictional tool occurring while out of contact with the glass surface, so that the frictional forces transferred to the soft glass strip compensate each other. Furthermore it is possible to cause the frictional tool to perform an oscillating movement. In this case the crank drive 12 is used for producing the oscillating movement. As is more particularly to be seen from FIG. 2, the pin 13 which is arranged eccentrically with respect to the shaft 14 moves along a circular path and the crank rod connected in a pivoting manner with the pins 13 and 15 imparts an oscillating movement as indicated by arrow f to the frictional tool 10.

Providing that the two crank drives 12 move synchronisely so as to be parallel to each other, the rubbing tool is moved so as to remain parallel to itself. It is, however, possible to cause the rubbing or frictional tool to perform other even or uneven movements when the phase position of the two crank drives 12 are modified or when they are driven with different speeds of rotation. In the case of an equal speed of rotation and a phase displacement of 180° the frictional tool 10, for example, performs a swinging movement about a vertical axis of rotation lying in its middle.

Figure 3:
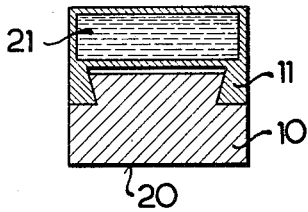
FIG. 3 shows an embodiment of the frictional tool used in accordance with the invention.

The actual frictional or rubbing tool consists in the case of this embodiment of the invention of graphite. However, instead of graphite it is also possible to use wood charcoal or other materials with similar properties. The frictional tool has a cross-section approximately as shown in FIG. 3. Its underside 20 is rough and flat. In order to avoid adhesion of the graphite on the hot glass the frictional tool is cooled. For this purpose the holding means 11, which is connected with the frictional tool 10 by means of a dovetail connection, is made hollow. The cavity 21 in it has cooling water passing through it. For the supply and removal of the cooling water use is made of flexible ducts 22, which can follow the movement of the frictional tool 10 and pass through the walls of the tin chamber in an outward direction.

Figure 4:
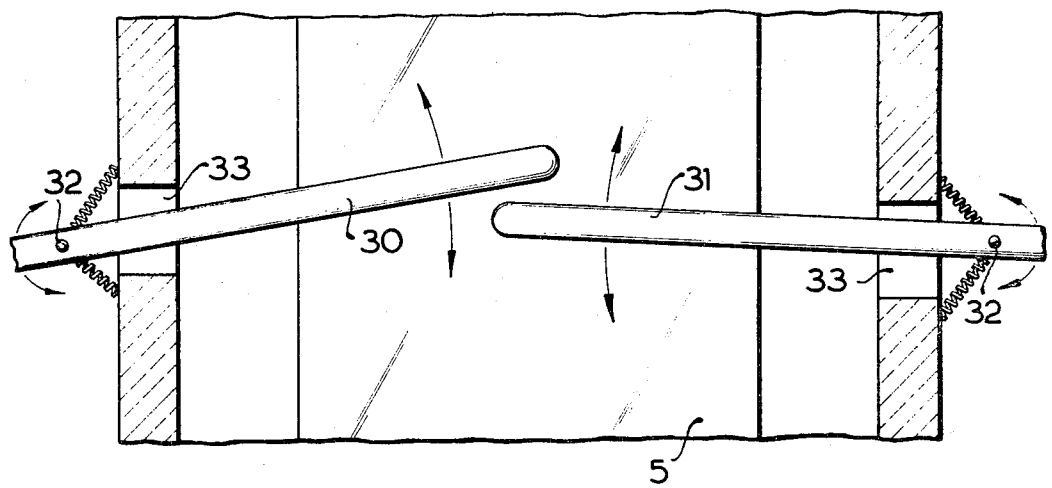
FIGS. 4 to 6 show further constructions involving the journalling and movement of the frictional tools.
Figure 5:
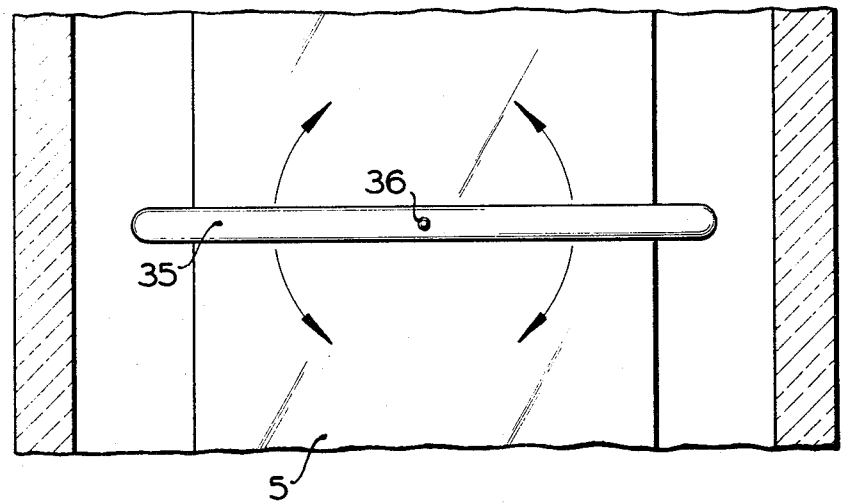
Figure 6:
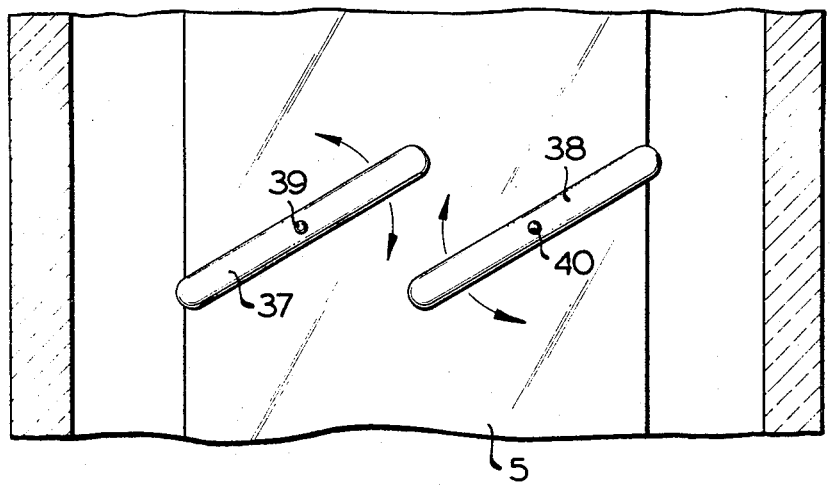

FIGS. 4, 5 and 6 show the principle applying for the arrangement in construction of the frictional tools in accordance with a further embodiment of the invention. Thus in the case of the embodiment in accordance with FIG. 4 two frictional tools 30 and 31 are provided which each deal with one half of the glass strip 5. They are pivotally mounted at 32 and pass through recesses 33 into the side walls of the tin bath chamber. From the outside they are caused to perform oscillating movements about the center of rotation 32. In the case of the embodiment in accordance with FIG. 5 a frictional tool 35, which extends over the whole breadth of the glass strip 5 above the glass strip at 36. The frictional tool 35 can perform rotary or swinging movements as may be required. FIG. 6 shows the embodiment, in which two frictional tools 37 and 38 are arranged along side one another and are pivoted at 39 and 40. Each of the two frictional tools reaches over a half of the glass. The frictional tools then turn in opposite direction so that the frictional forces transferred to the glass strip cancel each other out and do not push the glass strip out of its desired path. It is of course possible to arrange more than two frictional tools beside one another and also, in some cases, to arrange from one behind the other.

Figure 2:
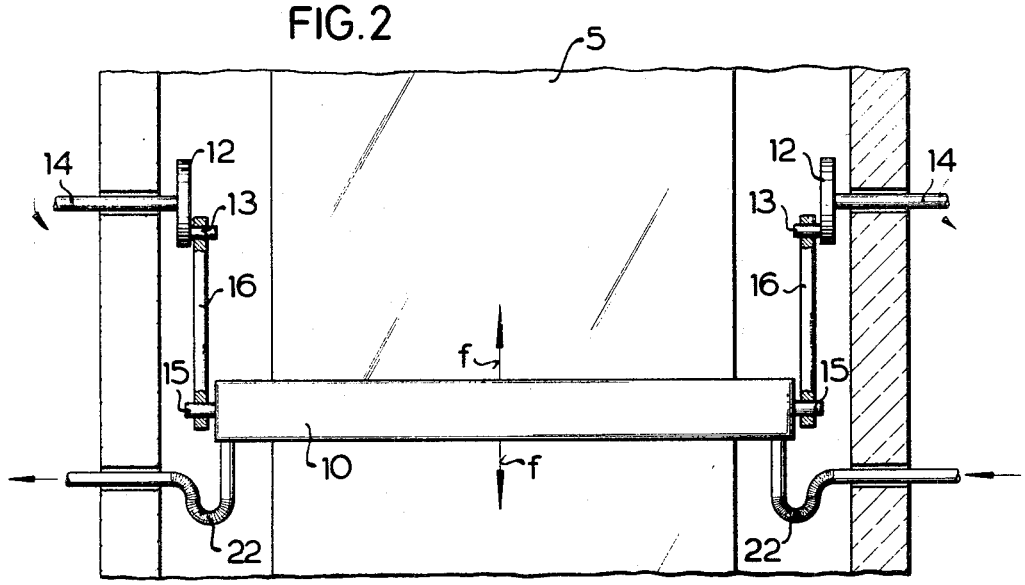
FIG. 2 is a cross-section through the installation shown in FIG. 1 in accordance with the plane II—II.
Figure 7:
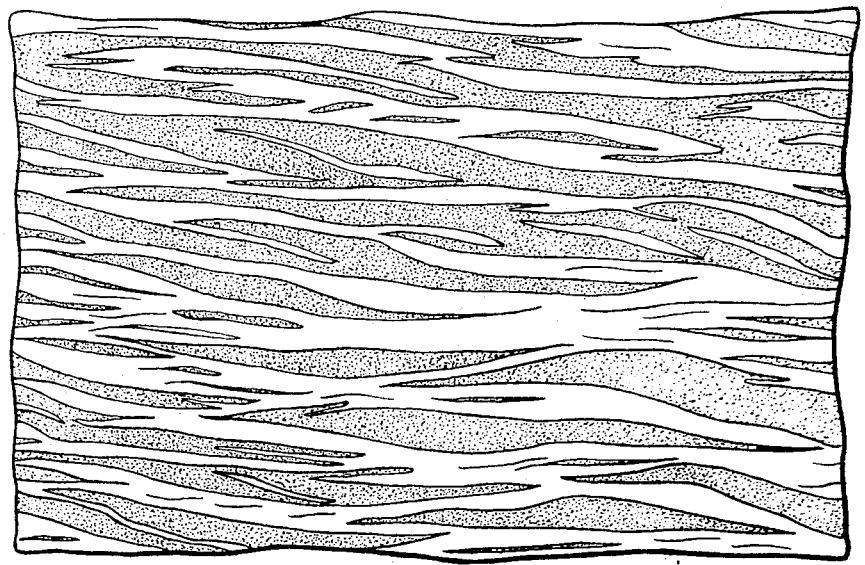
FIG. 7 shows an ornament produced in accordance with the invention.

FIG. 7 shows a glass surface pattern as can be produced with the installation described with reference to FIGS. 1 and 2. For the production of this pattern the glass strip is drawn out to approximately double its length following the roughening treatment. The length of glass surface, that is to say in the direction of the streaks, is approximately 15 cm. The light strip like regions have a fire-polished surface as is normal in float glass. The region shown as being dark are roughened and their appearance is therefore that of so-called matted glass. They have a fine silky shine and endow the product with an interesting appearance.

The new method has been described with reference to forms of apparatus with which the upper surface is roughened. It is, however, possible to arrange the roughening tools within the tin bath itself so that the lower surface is roughened. It is also possible to roughen both surfaces of the glass strip.

I claim:

1. A method for the production of a flat glass strip comprising placing molten glass at a controlled rate on a bath of molten metal on which said molten glass spreads out to form a strip of even thickness, producing a temperature gradient through the thickness of said glass strip so that an upper surface of said glass strip has a higher temperature than the glass further down, bringing said upper surface of said glass strip while on the metal bath within a metal bath chamber into contact with a non-adhesive frictional tool, roughening said upper surface of said glass strip with said non-adhesive frictional tool, heat treating said glass strip so that said roughening of said upper surface is at least partially preserved, allowing said glass strip to cool, and removing said glass strip from said bath with said roughening retained in said upper surface thereof.

2. A method in accordance with claim 1, further characterized by stretching said glass strip in a longitudinal direction after said roughening of said upper surface of said glass strip to reduce the breadth and thickness thereof.

3. A method in accordance with claim 1, further characterized by placing said non-adhesive frictional tool in intermittent contact with said upper surface of said glass strip.

4. A method in accordance with claim 1, further characterized by oscillating said non-adhesive frictional tool on said upper surface of said glass strip after said upper surface is brought into contact with said tool.

5. A method in accordance with claim 1, further characterized by rotating said non-adhesive friction tool in the plane of said upper surface of said glass strip while in contact therewith.

6. A method in accordance with claim 1, further characterized by cooling said non-adhesive frictional tool.

References Cited

UNITED STATES PATENTS

| 3,472,641 | 10/1969 | Gray | 65—182 X |
| 3,486,869 | 12/1969 | Aloneo | 65—182 X |
| 3,486,873 | 12/1969 | D'eustachio | 65—182 X |

S. LEON BASHORE, Primary Examiner

R. L. LINDSAY, Jr., Assistant Examiner

U.S. Cl. X.R.

65—61, 99 A, 182 R